United States Patent
Yan (10) Patent No.: US 7,697,302 B2
(45) Date of Patent: Apr. 13, 2010

(54) MOUNTING APPARATUS FOR EXPANSION CARDS

(75) Inventor: Chi-Pin Yan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/141,856

(22) Filed: Jun. 18, 2008

(65) Prior Publication Data
US 2009/0147486 A1    Jun. 11, 2009

(30) Foreign Application Priority Data
Dec. 7, 2007    (CN) .................. 2007 1 0202933

(51) Int. Cl.
*H05K 7/14* (2006.01)
(52) U.S. Cl. .............. 361/801; 361/683; 361/732; 361/740; 361/747; 361/759
(58) Field of Classification Search .......... 361/801, 361/679, 683, 732, 740, 747, 759
See application file for complete search history.

(56) References Cited

U.S. PATENT DOCUMENTS

| | | | |
|---|---|---|---|
| 6,138,839 A * | 10/2000 | Cranston et al. ......... 211/41.17 |
| 6,181,565 B1 * | 1/2001 | Schmitt et al. ............. 361/756 |
| 6,494,729 B1 * | 12/2002 | Stathopoulos et al. ....... 439/160 |
| 6,693,800 B1 * | 2/2004 | Lin et al. .................... 361/759 |
| 6,738,261 B2 * | 5/2004 | Vier et al. ................... 361/740 |
| 7,002,811 B2 * | 2/2006 | Jing et al. ................... 361/801 |
| 7,012,813 B2 * | 3/2006 | Wang et al. ................ 361/801 |
| 7,265,968 B2 * | 9/2007 | Champion et al. ......... 361/679 |
| 2007/0242442 A1 * | 10/2007 | Dai ............................ 361/801 |

* cited by examiner

*Primary Examiner*—Jinhee J Lee
*Assistant Examiner*—Xiaoliang Chen
(74) *Attorney, Agent, or Firm*—Steven M. Reiss (57) ABSTRACT

A mounting apparatus is configured for fixing an expansion card. The mounting apparatus includes a support fixed to an enclosure, a fastening member, and a latching member pivotably coupled to the fastening member. One end of the fastening member is fixed to the support, and the other end of the fastening member is urged against the expansion card. The latching member includes a first elastic portion configured for pressing the fastening member, and a locking portion extending from the first elastic portion. When the first elastic portion is pressed, the first elastic portion is deformed to press the fastening member to urge against the expansion card, and the latching portion is engaged in the support.

14 Claims, 10 Drawing Sheets

MOUNTING APPARATUS FOR EXPANSION CARDS

BACKGROUND

1. Field of the Invention

The present invention relates to mounting apparatuses for expansion cards. The invention particularly relates to a mounting apparatus that readily secures a plurality of expansion cards in a computer enclosure and allows convenient removal of the expansion cards therefrom.

2. Description of Related Art

In order to upgrade the operating capabilities of a personal computer, expansion cards are commonly installed in the computer enclosure. Typical types of expansion cards include network cards, sound cards, graphics accelerator cards and multi-media cards, etc. These expansion cards may be installed in the computer enclosure during its original manufacture or by the computer purchaser.

Usually, the mounting apparatus for expansion cards includes a pressing element and a screw to secure a separate cover plate of each expansion card. However, installing screws one by one is time-consuming and cumbersome. Moreover, during installation/removal of the expansion cards, one or more of the screws can easily fall into the crowded interior of the computer, thereby creating a difficult retrieval.

SUMMARY

An exemplary mounting apparatus configured for fixing expansion cards includes a support fixed to an enclosure, a fastening member configured for securing an expansion card, and a latching member pivotably connected to the fastening member. An end of the fastening member is fixed to the support, and an opposite end of the fastening member is urged against the expansion card. The latching member includes a first elastic portion resisting against the fastening member, and a locking portion extending from the first elastic portion. When the first elastic portion with the latching member is pressed, the first elastic portion is deformed to press the fastening member, the fastening member is configured to secure the expansion card, and the locking portion resists against the support.

Other advantages and novel features will become more apparent from the following detailed description when taken in conjunction with the accompanying drawings, in which:

DETAILED DESCRIPTION

Figure 1:
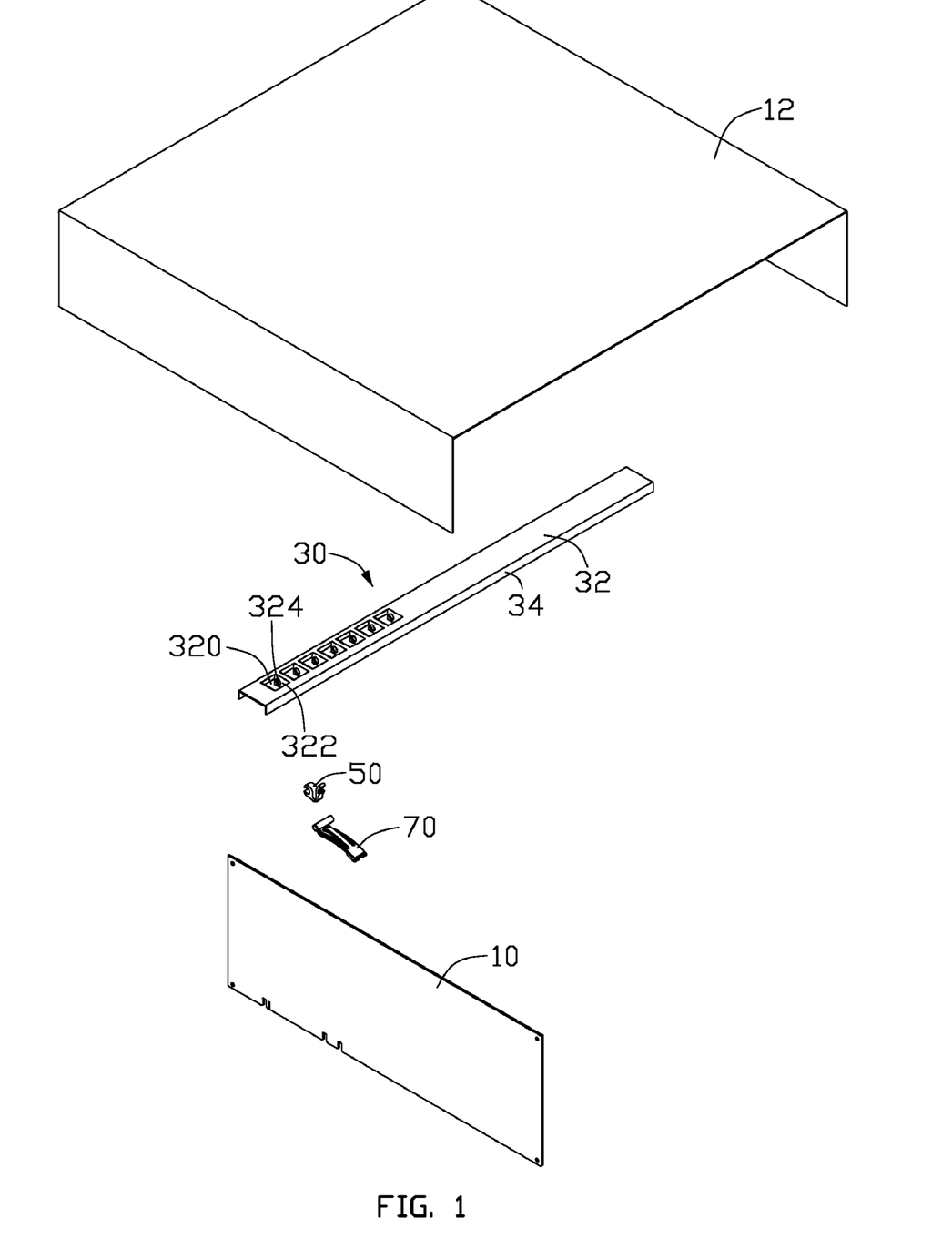
FIG. 1 is an exploded, isometric view of a mounting apparatus for expansion cards in accordance with a first embodiment of the present invention, together with an expansion card, and an enclosure, the mounting apparatus including a latching member, a fastening member, and a support.

Referring to FIG. 1, a mounting apparatus for expansion cards in accordance with a first embodiment of the present invention is provided for fixing a expansion card 10 to an enclosure 12 of an electronic device such as a computer. The mounting apparatus includes a support 30, a latching member 50, and a fastening member 70.

Figure 2:
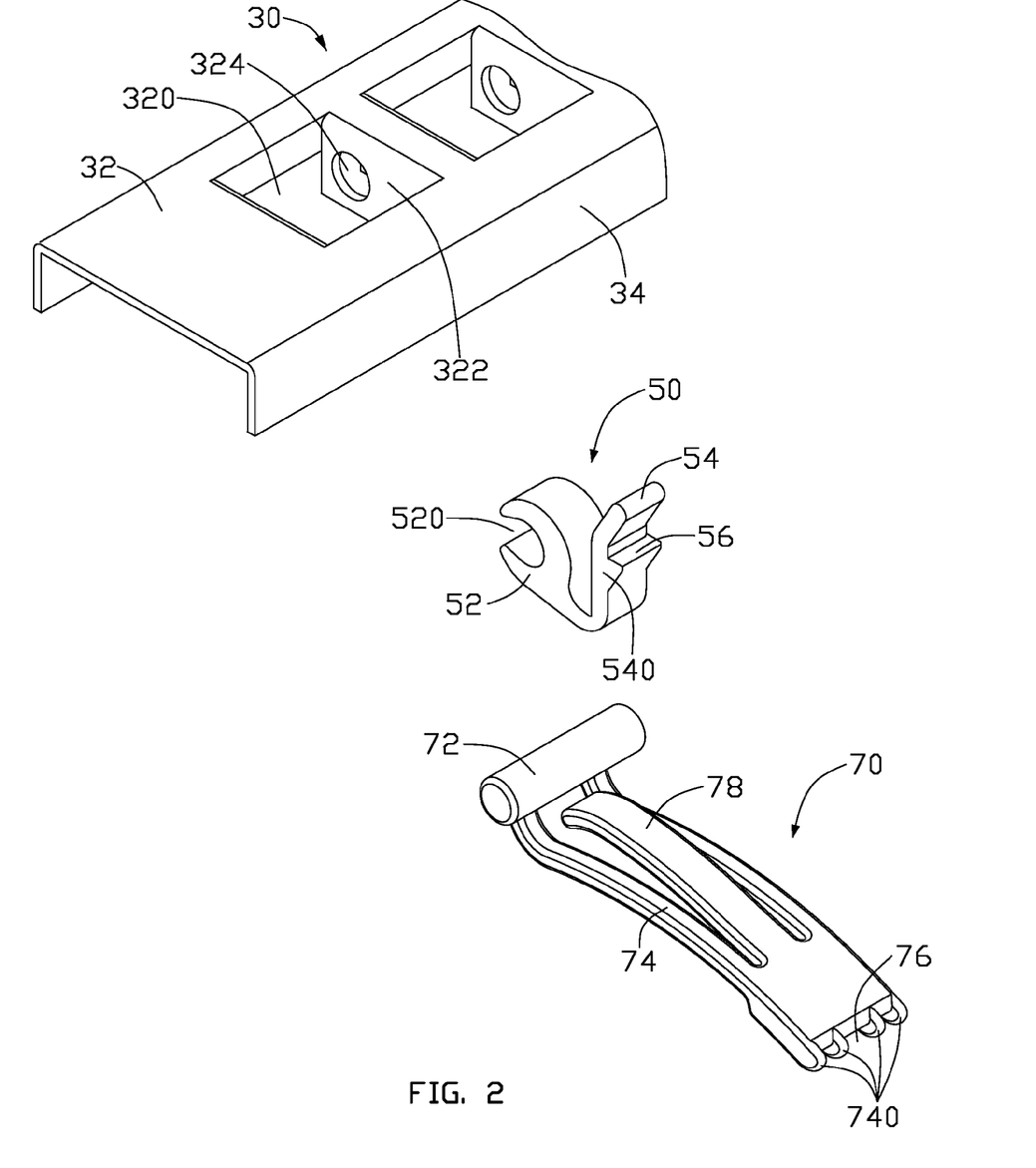
FIG. 2 is an isometric view of the latching member, the fastening member, and a part of the support of FIG. 1.

Referring to FIG. 1 and FIG. 2, the support 30 includes a board 32 defining a through hole 320 neighboring an end thereof, and two sidewalls 34 respectively extending downward from two opposite longitudinal edges of the board 32. Two tabs 322 each defining a fixing hole 324 respectively extend downward from two opposite edges of the through hole 320 perpendicular to the sidewall 34.

The latching member 50 includes a cylinder-shaped pivoting portion 52 defining a C-shaped through opening 520. A first elastic portion 540 extends from a bottom of the pivoting portion 52 away from the opening 520, and then the first elastic portion 540 extends directly up, and then slantingly upwardly to form an operating portion 54. A locking portion 56 extends outward from the first elastic portion 540.

The fastening member 70 includes a cylinder shaft 72, and an arcuate elastic main body 74 extends from the shaft 72. A plurality of stopper blocks 740 extend from a distal end away from the shaft 72 of the main body 74, forming a stopper portion 76 between each two adjacent stopper blocks 740. An arc-shaped spring portion 78 extends toward the shaft 72 from a portion of the main body 74 neighboring the stopper portion 76.

Figure 3:
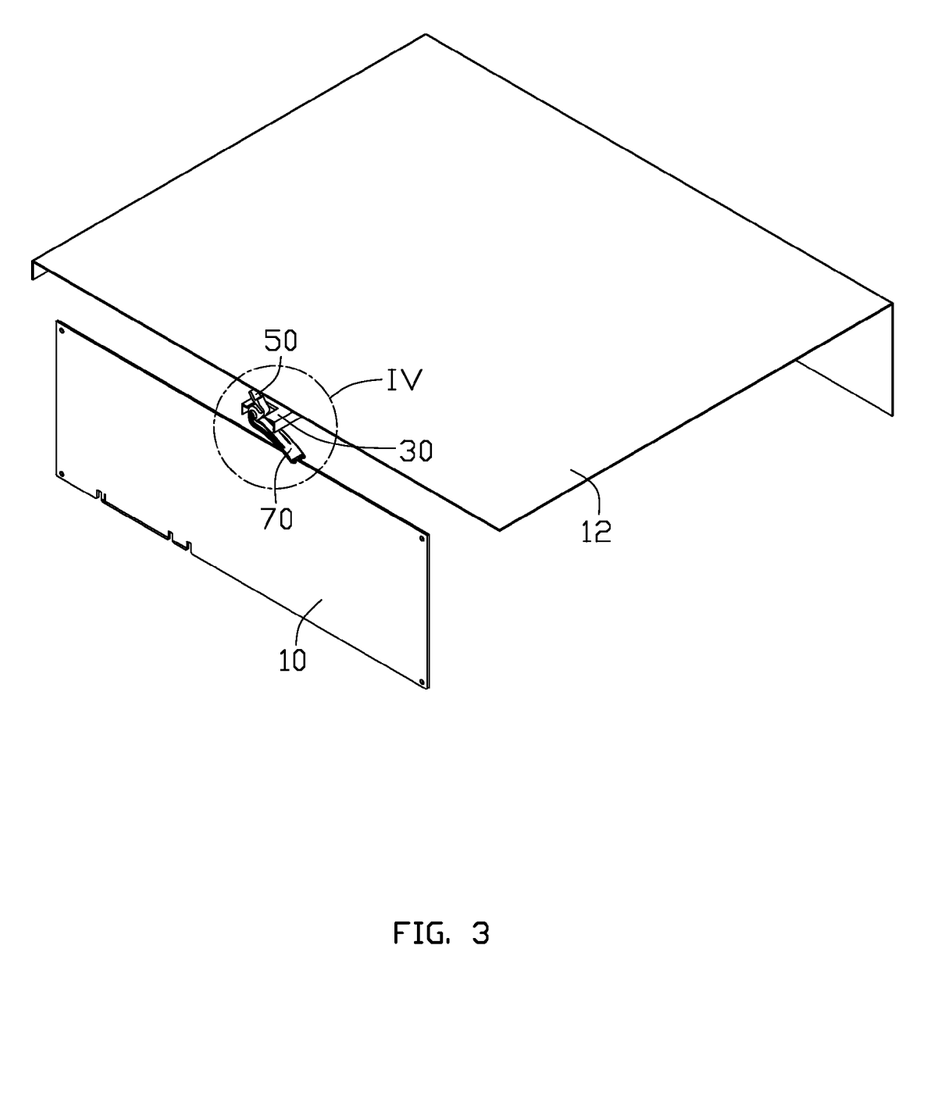
FIG. 3 is a partial assembled view of the enclosure, expansion card, and fastening member of FIG. 1.
Figure 4:
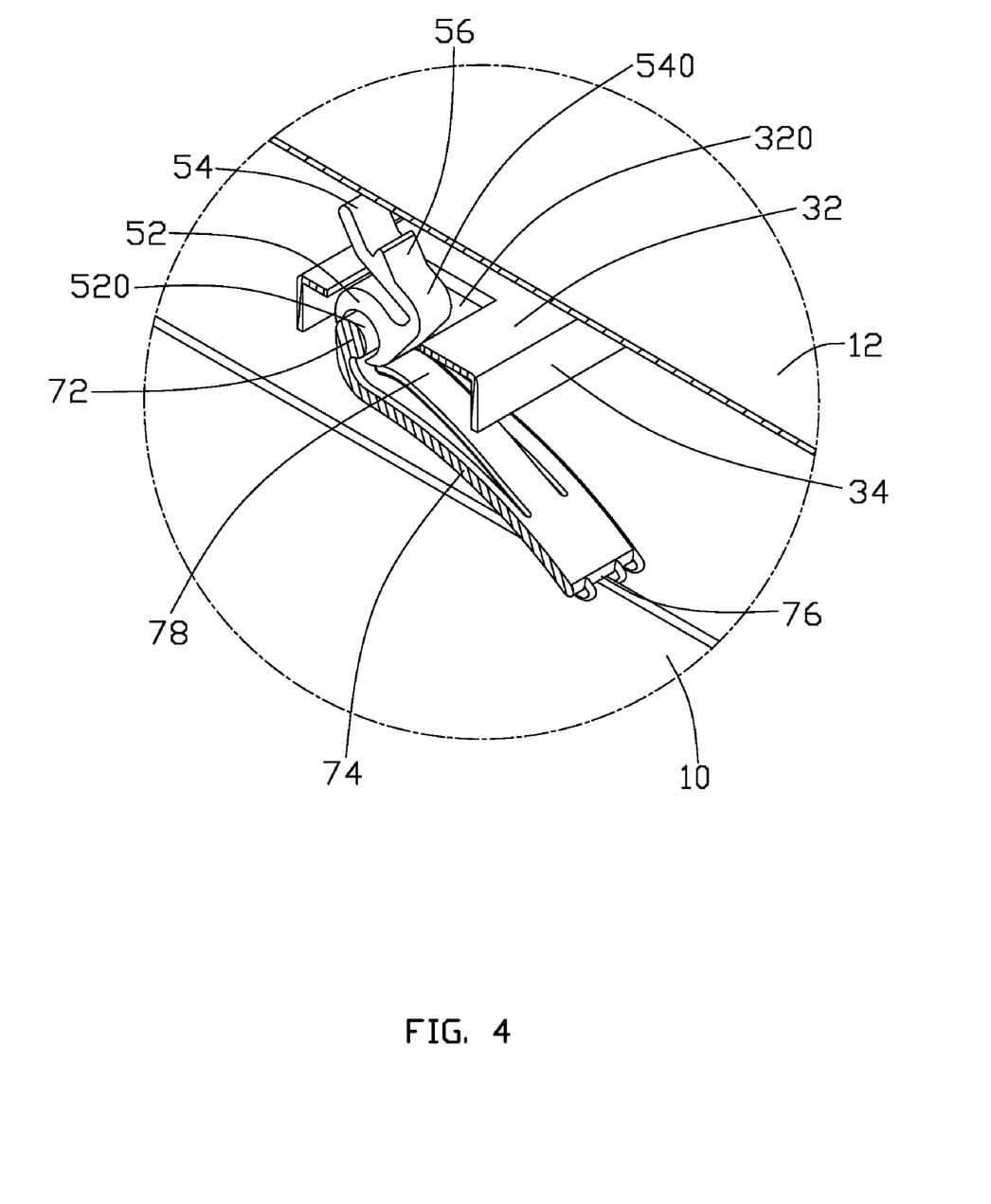
FIG. 4 is an enlarged view of a circled portion IV of FIG. 3.

Referring to FIGS. 3 and 4, in assembly, the support 30 is fixed to the enclosure 12. Two ends of the shaft 72 of the fastening member 70 are respectively fixed to the fixing hole 324 of the support 30. The latching member 50 is extended through the through hole 320 of the support 32, and the opening 520 of the latching member 50 snappingly pivotably engages with the shaft 72. The pivoting portion 52 and the first elastic portion 540 of the latching member 50 are received in the through hole 320, but the operating portion 54 and the locking portion 56 are exposed to outside from the through hole 320. The stopper portion 76 of the fastening member 70 presses the corresponding expansion card 10.

Figure 5:
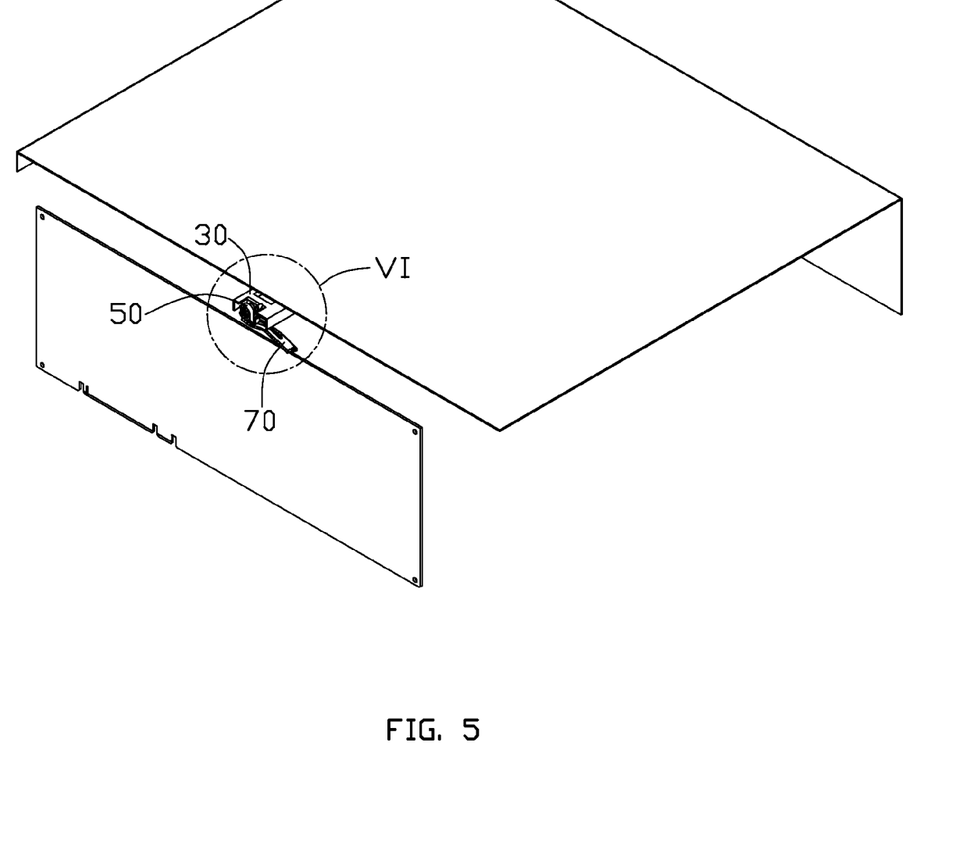
FIG. 5 is an assembled view of using state of the FIG. 3.
Figure 6:
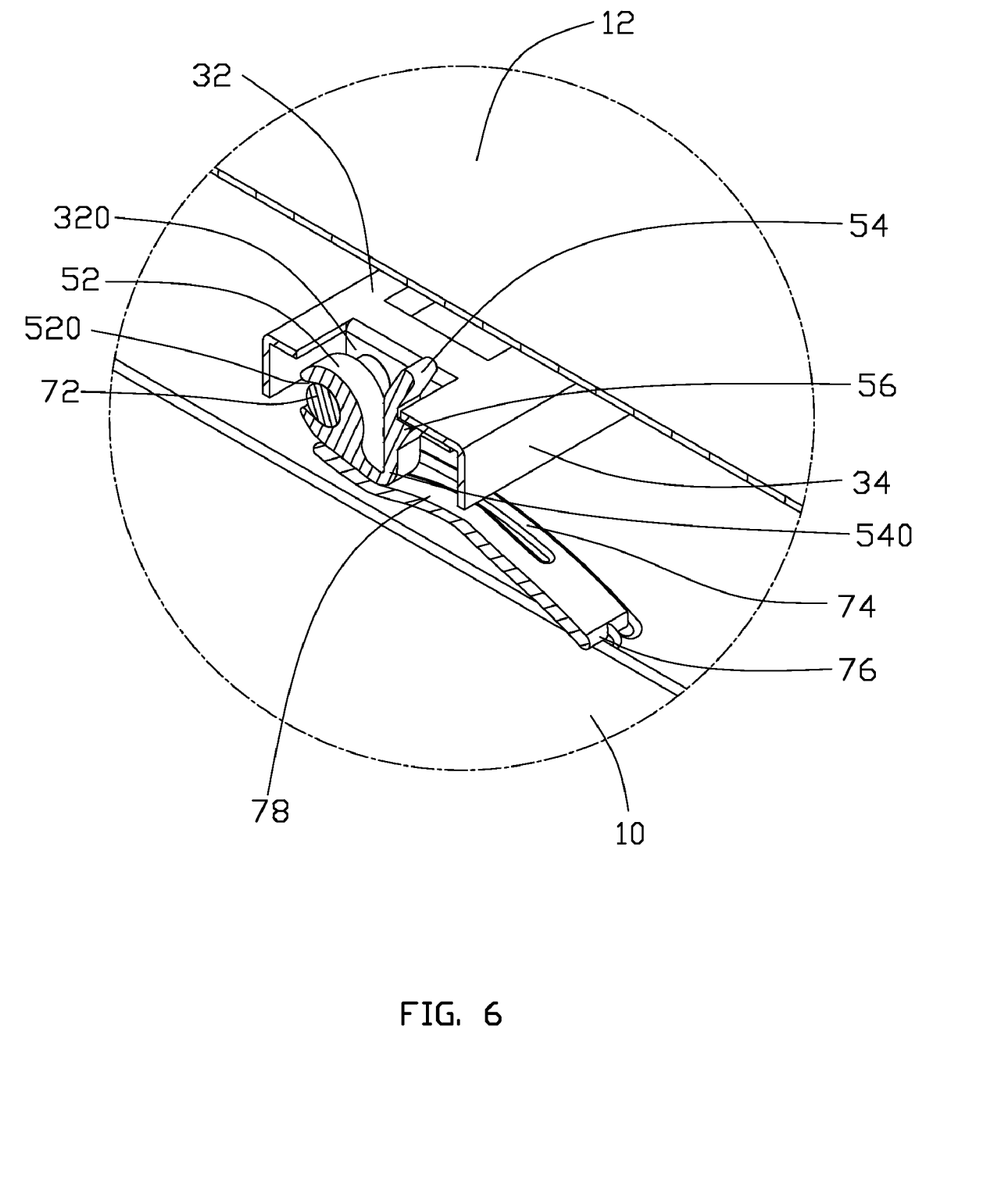
FIG. 6 is an enlarged view of a circled portion VI of FIG. 5.

Referring to FIGS. 5 and 6, in using, the operating portion 54 is pressed for forcing the first elastic portion 540 to deform and then rotated around the shaft 72 until the locking portion 56 of the latching member 50 is extended through the through hole 320 of the support 30. Then the operating portion 54 is released, and the first elastic portion 540 is restored to drive the locking portion 56 thereof to urge against an underside of the support 30 bounding the through hole 320. A bottom edge of the latching member 50 presses a free end of the spring portion 78 downward toward the spring portion 78, forcing the spring portion 78 and the main body 74 to deform toward the expansion card 10. Therefore, the stopper portion 76 of the main body 74 tightly presses the expansion card 10.

To detach the expansion card 10 from the enclosure 12, the operating portion 54 is pressed for disengaging the locking portion 56 from the support 30, and rotated around the shaft 72 until the locking portion 56 of the latching member 50 is rotated out via the through hole 320. The latching member 50 releases pressure upon the free end of the spring portion 78. The spring portion 78 and the main body 74 are restored. Therefore, the fastening member 70 with the stopper portion 76 move up, and the expansion card 10 is ready to be removed from the enclosure 12.

Figure 7:
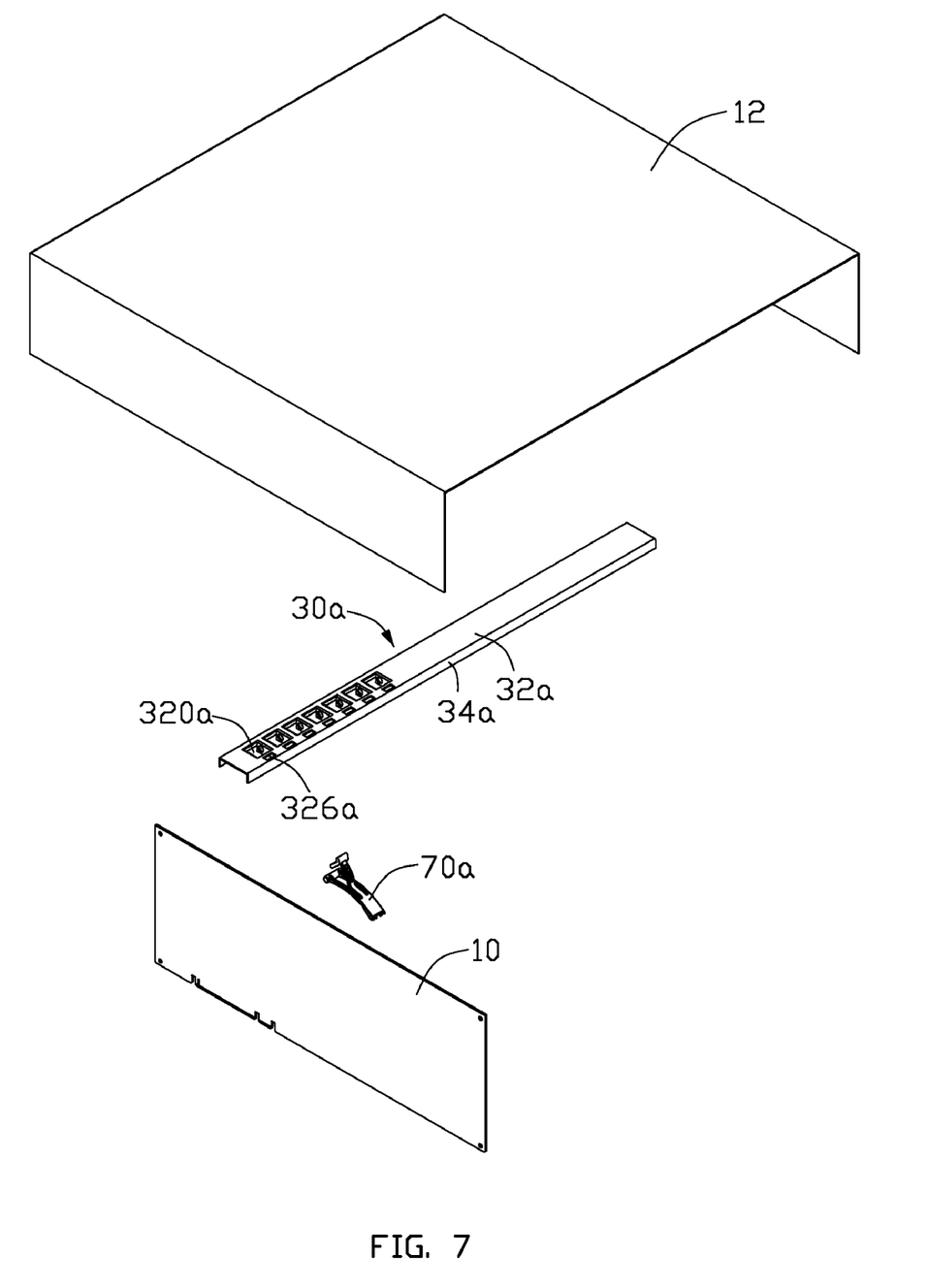
FIG. 7 is an exploded, isometric view of a mounting apparatus for expansion cards in accordance with a second embodiment of the present invention, together with an expansion card, and an enclosure, the mounting apparatus including a latching member, a fastening member, and a support.
Figure 8:
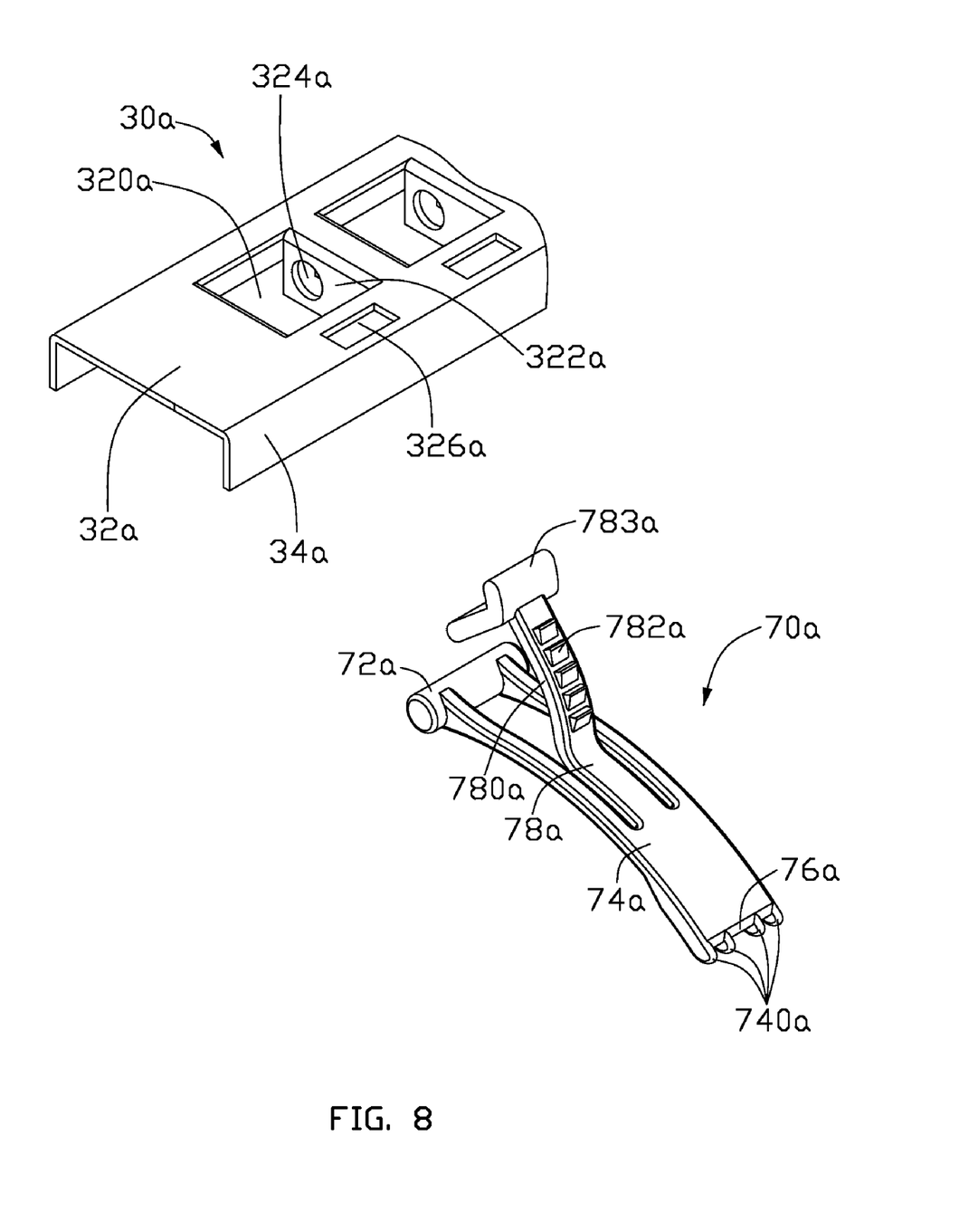
FIG. 8 is an isometric view of the fastening member, and part portion of the support of FIG. 7.

Referring to FIGS. 7 and 8, a mounting apparatus for expansion cards in accordance with a second embodiment of the present invention includes a support 30a, and a fastening member 70a.

The support 30a includes a board 32a defining a through hole 320a neighboring an end thereof, and two sidewalls 34a respectively extending downward from two opposite longitudinal edges of the board 32a. Two tabs 322a each defining a fixing hole 324a respectively extend from two opposite edges of the through hole 320a perpendicular to the sidewall 34a. The board 32a defines a positioning hole 326a adjacent an edge thereof, and neighboring the through hole 320a.

The fastening member 70a includes a cylinder shaft 72a, and an arcuate elastic main body 74a extends from the shaft 72a. A plurality of stopper blocks 740a extend from a distal end away from the shaft 72a of the main body 74a, forming a stopper portion 76a between each two adjacent stopper blocks 740a. An arc-shaped spring portion 78a extends towards to the shaft 72a from a portion neighboring the stopper portion 76a of the main body 74a. A first elastic portion 780a extends upwards from a free end of the spring portion 78a. A plurality of locking portions 782a extend outward from the first elastic portion 780a, and an elastic operating portion 783a extends from a free end of the first elastic portion 780a.

Figure 9:
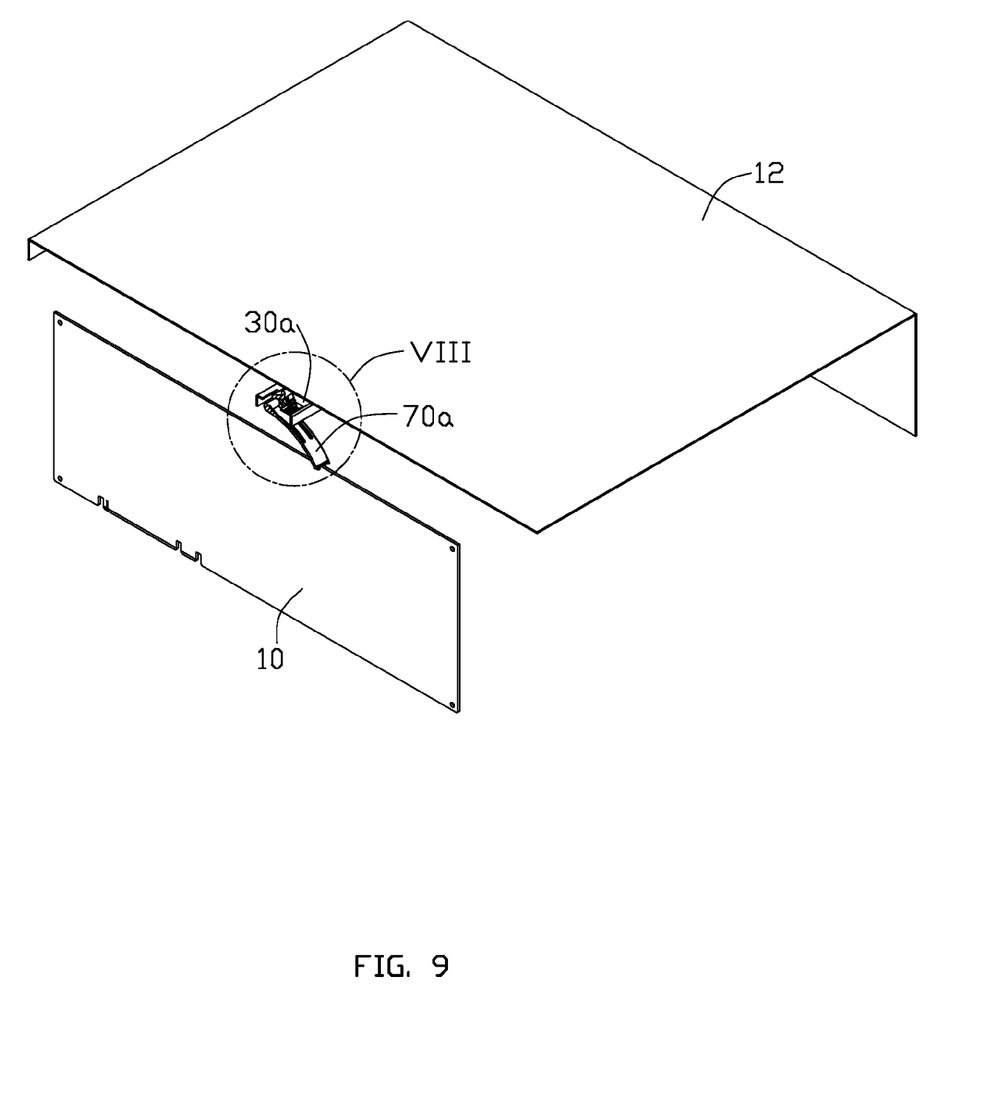
FIG. 9 is a partial assembled view of the enclosure, expansion card, and fastening member of FIG. 7.
Figure 10:
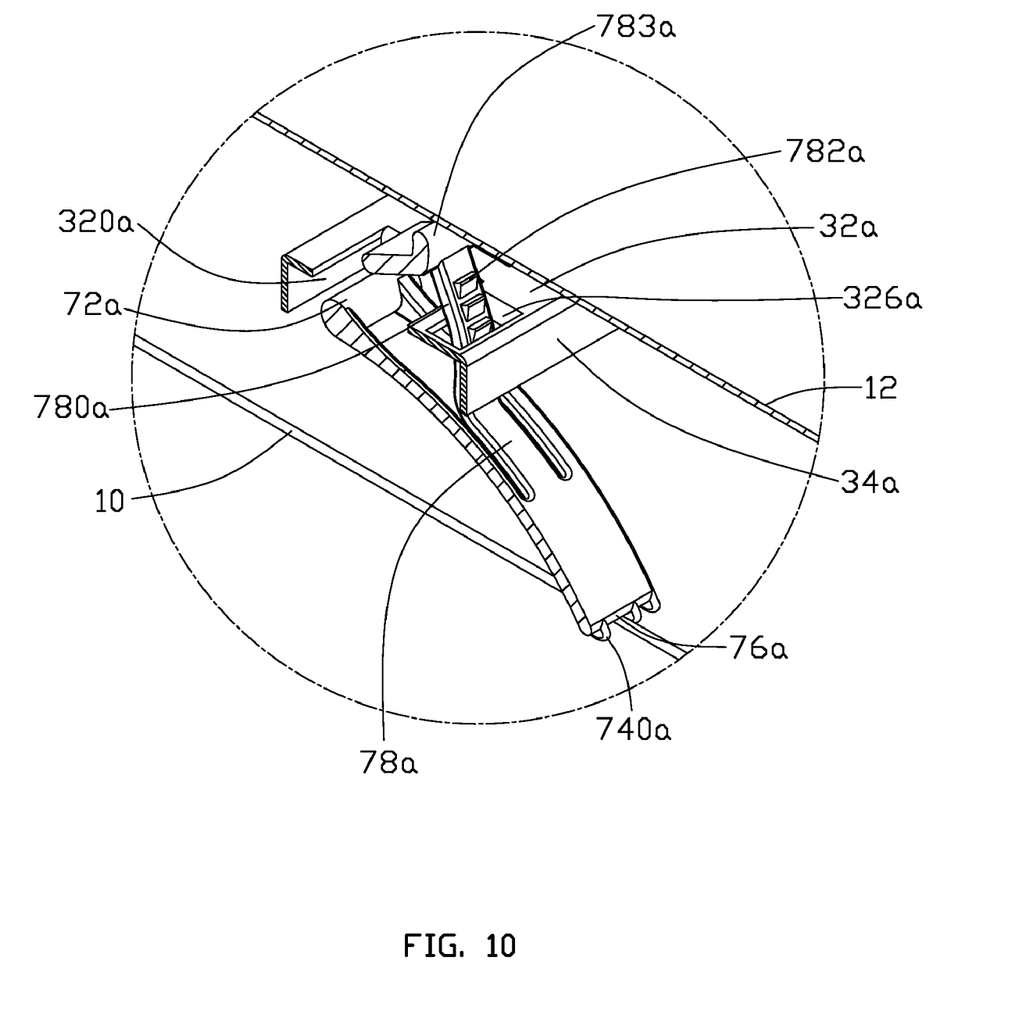
FIG. 10 is an enlarged view of a circled portion VIII of FIG. 9.

Referring to FIG. 9 and FIG. 10, in assembly, the support 30a is fixed to the enclosure 12. The operating portion 783a with the first elastic portion 780a is clamped to pass through the positioning hole 326a of the support 30a from down up. Two ends of the shaft 72a of the fastening member 70a are respectively fixed to the fixing hole 324a of the support 30a. Each stopper portion 76a of the fastening member 70a presses the corresponding expansion card 10.

In use, the operating portion 783a is pressed to deform the first elastic portion 780a, the spring portion 78a, and the main body 74a, and then moved into the positioning hole 326a with the locking portions 782a of the first elastic portion 780a. When the main body 74a is deformed enough to force each stopper portion 76a to urge against the expansion card 10, the operating portion 783a is released. The first elastic portion 780a is restored and the locking portion 782a moves upward and presses against an edge of the positioning hole 326a of the support 30a. Each stopper portion 76 of the fastening member 70 tightly presses the corresponding expansion card 10.

To detach the expansion card 10 from the enclosure 12, the operating portion 783a is controlled for disengaging from the positioning hole 326a of the support 30 with the locking portion 782a. Then, the operating portion 783a is drew to move out from the positioning hole 326a with the first elastic portion 780a. Therefore, the fastening member 70a with the stopper portion 76a move up, and the expansion card 10 is ready to be removed from the enclosure 12.

It is believed that the present embodiments and theirs advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A mounting apparatus for expansion cards comprising:
a support fixed to an enclosure;
a fastening member configured for securing an expansion card; the fastening member comprising a first end fixed to the support, and a second end urged against the expansion card; and
a latching member pivotably connected to the fastening member, the latching member comprises a first elastic portion is biased against the support, a locking portion extending from the first elastic portion, wherein the support comprises a board defining a through hole; the through hole comprises two tabs that extend from opposite sides of the through hole, each tab defines a fixing hole; the fastening member comprises a shaft, the ends of the shaft are located in the fixing holes; the latching member comprises a pivoting portion defining an opening and is pivotably attached to the shaft;
wherein when the first elastic portion with the latching member is pressed, the first elastic portion is deformed and urged against the fastening member; the fastening member is configured to press the expansion card, and the locking portion pressed against the support.

2. The mounting apparatus for expansion cards as claimed in claim 1, wherein the fastening member further comprises an elastic main body extending from an edge of the shaft, and a spring portion that extends towards the shaft; wherein part of the latching member is received in the through hole of the support, the first elastic portion is urged against the spring portion.

3. The mounting apparatus for expansion cards as claimed in claim 2, wherein the shaft is located on the proximal portion of the fastening member; and wherein the fastening member further comprises a stopper portion; the stopper portion is comprised of a plurality of stopper blocks, wherein the stopper portion is biased against the expansion card.

4. The mounting apparatus for expansion cards as claimed in claim 1, wherein the first elastic portion extends from a bottom of the pivoting portion away from the opening, then extends upwardly; the locking portion is urged against an underside of the board near the through hole.

5. A mounting apparatus for expansion cards comprising:
a support fixed to an enclosure comprising a board defining a positioning hole; and
a fastening member configured for securing an expansion card, the fastening member comprising a first end fixed to the support, and a second end urged against the expansion card, wherein the board defines a through hole; the through hole comprises two tabs that extend opposite sides of the through hole, each tabs defines a fixing hole; the fastening member comprises a shaft, the ends of the shaft are located in the fixing holes;
a first elastic portion extending from the fastening member, the first elastic portion passed through the positioning hole of the board and partly exposed outside the positioning hole;
a plurality of locking portions extending from the first elastic portion, wherein one of the plurality of locking portions rest on an edge of the positioning hole;
wherein the locking portion presses against an edge of the positioning hole, and the second end of the fastening member is pressed against the expansion card; and when the first elastic portion is pressed, the locking portions is capable of moving into the positioning hole.

6. The mounting apparatus for expansion cards as claimed in claim 5, wherein the fastening member farther comprises an elastic main body extending from the shaft and a stopper portion; the stopper portion comprises a plurality of stopper blocks, wherein the stopper portion is biased against the expansion card.

7. The mounting apparatus for expansion cards as claimed in claim 6, wherein a spring portion extends toward the shaft, and the first elastic portion extends upwards from a free end of the spring portion.

8. The mounting apparatus for expansion cards as claimed in claim 5, wherein an operating portion extends from a free end of the first elastic portion and is exposed outside the fixing hole of the board.

9. A mounting apparatus for expansion cards comprising:
a support fixed to an enclosure, the support defining a through hole, and two tabs extending from opposite sides of the through hole, each tab defining a fixing hole; and
a fastening member configured for securing an expansion card, the fastening member comprising a shaft located at a first end, a second end opposite to the first end, and urged against the expansion card, a spring portion, and an elastic main body between the first and second ends, opposite ends of the shaft fixed to the corresponding fixing holes of the tabs;
the spring portion extended toward the first end from a portion of the second end;
wherein the spring portion is depressed away from the support, such that the main body asserts force via the second end against the expansion card.

10. The mounting apparatus for expansion cards as claimed in claim 9, further comprises a latching member pivotably connected to the fastening member; the latching member comprises a first elastic portion biases against the fastening member, a locking portion extending from the first elastic portion; the support further comprises a board, and the through hole is defined in the board; wherein part of the latching member is received in the through hole of the support, and the locking portion is urged against an underside of the board near the through hole.

11. The mounting apparatus for expansion cards as claimed in claim 10, wherein the spring portion extends towards the shaft, the first elastic portion is urged against the spring portion; the latching member further comprises a pivoting portion defining an opening, and is pivotably attached to the shaft.

12. The mounting apparatus for expansion cards as claimed in claim 9, wherein the support comprises a board defining a positioning hole; a first elastic portion is extended from a distal end of the spring portion, and a plurality of locking portions extend outward from the first elastic portion; the first elastic portion is passed through the positioning hole and partly exposed outside the positioning hole; the locking portion presses against an edge of the positioning hole.

13. The mounting apparatus for expansion cards as claimed in claim 12, wherein an operating portion extends from a free end of the first elastic portion and is exposed outside the positioning hole of the board.

14. The mounting apparatus for expansion cards as claimed in claim 9, wherein the second end of the fastening member further comprises a stopper portion; the stopper portion is comprised of a plurality of stopper blocks, wherein the stopper portion is biased against the expansion card.

* * * * *